Nov. 10, 1970 T. E. GARDNER ET AL 3,539,928

OPERATIONAL MULTIPLEXER

Filed Nov. 13, 1968 2 Sheets-Sheet 1

INVENTORS
THOMAS E. GARDNER
BERTRAM F. KUPERSMITH
BY Melvin Pearson Williams
ATTORNEY

OPERATIONAL MULTIPLEXER

Filed Nov. 13, 1968 2 Sheets-Sheet 2

United States Patent Office 3,539,928

Patented Nov. 10, 1970

3,539,928

OPERATIONAL MULTIPLEXER

Thomas E. Gardner, Sunnyvale, Calif., and Bertram F. Kupersmith, Bloomfield, Conn., assignors to United Aircraft Corporation, East Hartford, Conn., a corporation of Delaware Filed Nov. 13, 1968, Ser. No. 775,247

Int. Cl. H03k *17/00*

U.S. Cl. 328—104 2 Claims

ABSTRACT OF THE DISCLOSURE

A plurality of data channels, each having an operational amplifier therein, are selectively multiplexed to a single data channel by means of a switch in the forward path of a feedback network connected to the operational amplifier. Since the switch is connected within the forward path of the feedback network, any impedances introduced by the switch, or offset voltages when the switch comprises dynamic elements, are eliminated from the signal as a result of the feedback.

BACKGROUND OF THE INVENTION

Field of invention

This invention relates to multiplexing, and more particularly to a multiplexer employing switched operational amplifiers.

Description of the prior art

Many forms of prior art multiplexers are known. The earliest forms of multiplexers utilized relays and/or other mechanical switching devices. These introduced delays which are beyond the design requirements of modern electronic equipment. Systems utilizing transistor switches usually result in large offset voltages in the actual transmitted signals. Field effect transistors have relatively high forward (on) impedances which result in gain errors and/or significant time constants. Multiplexers known to the art which have overcome these difficulties are highly complex and very expensive and, at times, are not compatible in space, weight and cost with the system in which they must be used.

SUMMARY OF INVENTION

The object of the present invention is to provide a relatively simple multiplexing apparatus which does not represent an error parameter to the multiplexed signal itself.

According to the present invention, a plurality of data channels each include an operational amplifier with switch means located in the forward path of the feedback loop; operation of the switch means for a selected one of the data channels causes connection of the signal on that channel to the output channel.

The present invention provides relatively simple multiplexing switching without introducing impedances, time constants or voltage offsets into the signal path, since these are effectively removed by feedback to the input of the operational amplifier. Because the selected operational amplifier operating through its feedback path, has an output impedance on the order of magnitude of a fraction of one ohm, and the remaining amplifiers, when not switched to the output channel, have very high impedances, (hundreds of thousands of ohms), the relatively simple multiplexer in accordance herewith provides excellent isolation between channels. This again is due in part to the fact that the virtual ground input impedance of the operational amplifier, when operating with feedback, is not present when the forward path of the feedback loop is open as a result of the multiplexing switch being open. Thus, the present invention provides a simple and effective multiplexing apparatus.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
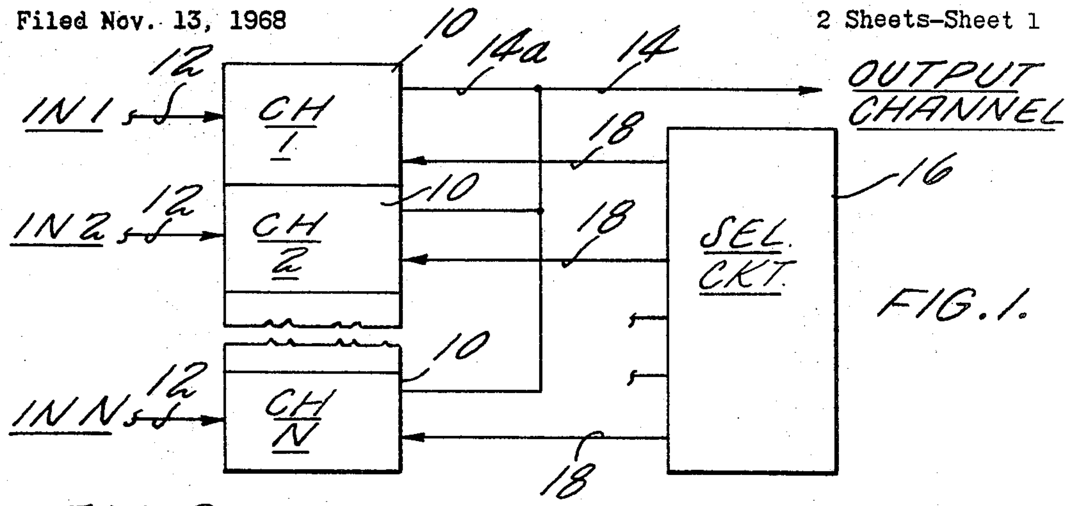
FIG. 1 is a schematic block diagram of a multiplexing system in which the present invention may be incorporated.

Referring now to FIG. 1, a multiplexed system generally provides a plurality of channels (such as channels 1, 2 . . . *n*) each of which is to be selectively connected to an output channel. As illustrated in FIG. 1, a plurality of circuits 10 are provided, one for each channel. Each of the circuits 10 has an input signal line 12 and is connected to the output channel line 14. In addition, a select circuit 16 provides a select signal on successive select lines 18, there being one select line corresponding to each of the channels. The present invention relates to the channel switch circuits 10, the embodiments of which are shown in FIGS. 2–5 and described hereinafter.

Figure 2:
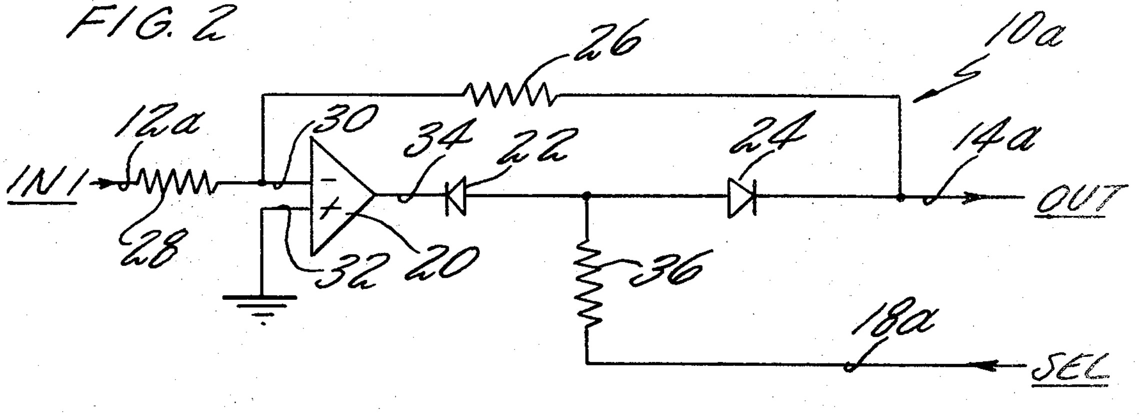
FIG. 2, is a schematic diagram of a first embodiment of a multiplexing switch in accordance with the present invention.

Referring now to FIG. 2, one multiplexing switch **10*a* in accordance with the present invention employs an operational amplifier 20 having a pair of diodes 22, 24 in the forward path of a feedback loop which includes a resistor 26. The input signal on line 12*a* is fed through a resistor 28 to the same input terminal 30 of the operational amplifier 20 as the feedback resistor 26; the other input terminal 32 being connected to ground or other suitable potential. As is well known in the art, the terminal 30 is called the inverting input terminal, and the terminal 32 is called a non-inverting input terminal, since the polarity of signal applied to the terminal 30 will be inverted at an output terminal 34 of the operational amplifier 20. The select signal on line 18*a* is applied through a resistor 36 to the junction of the diodes 22, 24**.

Figure 6:
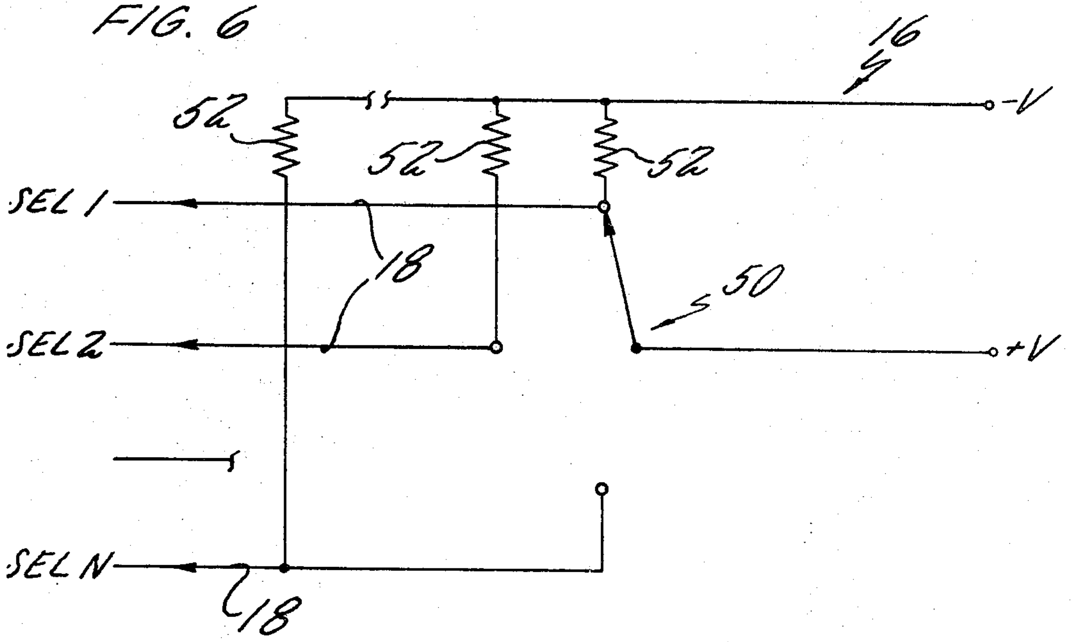
FIG. 6 is a schematic diagram of a typical select circuit which may be employed in the overall system illustrated in FIG. 1.

In operation, one of the channels 1, 2 . . . *n* which is to be selected for connection to the output channel 14 receives a select signal on line **18*a*, which signal is (in the embodiments illustrated herein) a positive potential (as shown in FIG. 6 and described in detail hereinafter). This positive signal must be sufficiently positive to be more positive than the most positive signal which can appear on the output terminal 34 of the operational amplifier 20. As an example, if the input terminals of the operational amplifier 20 may range between plus and minus ten volts, then a select signal of plus fifteen volts is suitable to cause forward biasing of the diodes 22, 24 for selection of the particular circuits 10*a* for connection to the output channel 14. When the particular channel is not to be connected, then the select signal line 18*a* may have on it minus fifteen volts, which is therefore more negative than the most negative potential which can appear on the output terminal 34 of the operational amplifier 20 thus insuring reverse biasing of the diodes 22, 24 so that they appear to be an open circuit within the forward path of the feedback loop of the operational amplifier 20. By application of a positive potential on the select signal line 18***a*, the diodes 22, 24 are both forward biased thus presenting nearly a short circuit between the output terminal 34 and a junction of the feedback path and the output channel line 14*a*. This permits the amplifier 20 to operate, providing a signal on the output line 14*a* which may have a slight offset in it due to the forwardly biased junction potential of the diodes, but this is carried back to the input terminal 30 through the feedback resistor 26 and because of the high gain of the amplifier, these errors are removed in accordance with the feedback technology well known in the art. Thus the signal on the output line 14*a* will inversely follow the signal applied on the input line 12*a* almost perfectly, subject to the characteristics of the operational amplifier 20.

As is known with respect to operational amplifiers with feedback, when the diodes 22, 24 are forwardly biased, then the output impedance at the output signal line 14*a* is extremely low, typically being small fractions of one ohm. On the other hand, when the signal on the select line 18*a* is negative (meaning that the particular channel is not being selected) then the feedback path is broken and the virtual ground characteristic of the input terminal 30 no longer holds true since there is no closed path for the operational amplifier 20. Thus the output impedance of the line 14*a* to ground is the total of the impedances of the feedback resistor 26, the input resistor 28, and the impedance of the source which is connected to the input signal line 12*a*. This is typically hundreds of thousands of ohms. Thus the one of the channels (1, 2 . . . *n*) which is connected to the output channel 14 has a fractional ohmic impedance, and the remaining channels, all connected in parallel, will have a combined impedance in the neighborhood of tens of thousands of ohms.

Figure 3:
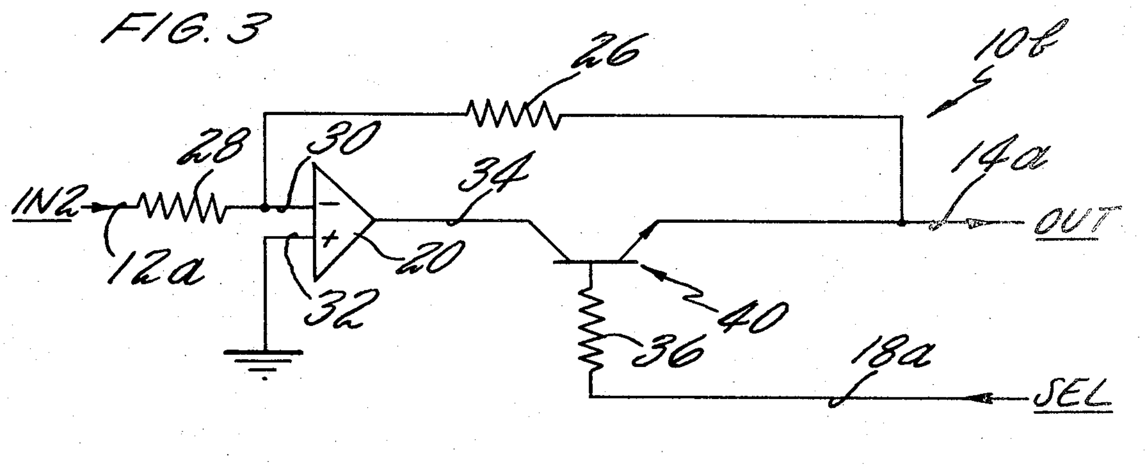
FIG. 3 is a schematic diagram of a second embodiment of a multiplexing switch in accordance with the present invention.

A second embodiment of the invention is illustrated in FIG. 3. Therein, a transistor 40 is connected between the output terminal 34 of the operational amplifier, and the junction of the output signal line 14*a* with the feedback line. The operation is similar to that of FIG. 2; a positive signal on the select line 18*a* will cause the transistor 40 to conduct, closing the forward path and selecting that particular channel for connection to output channel 14. The saturation impedance and voltages of the transistor 40 in the forward path of the feedback loop are eliminated from circuit consideration due to the high gain of the amplifier 20 in accordance wth well-known feedback technology.

Figure 4:
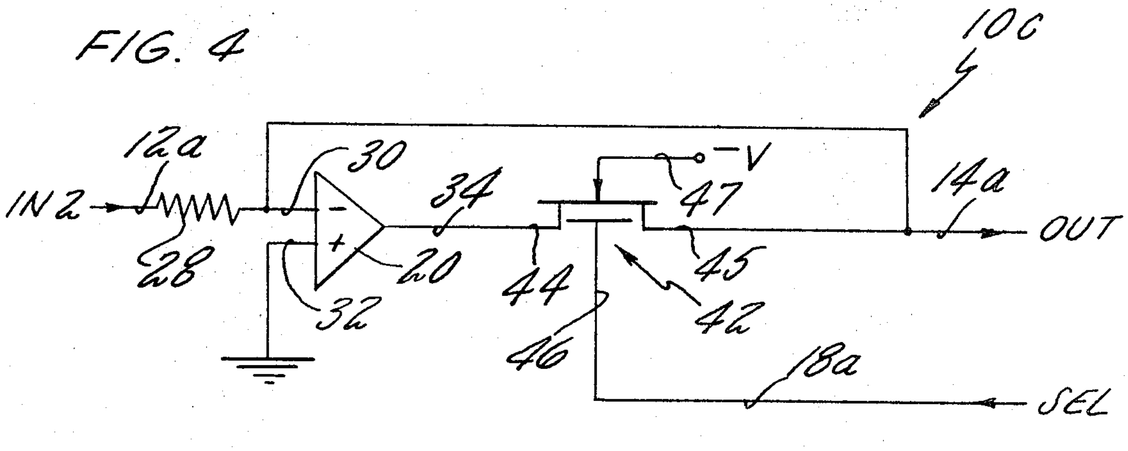
FIG. 4 is a schematic diagram of a third embodiment of a multiplexing switch in accordance with the present invention.

In the embodiment of FIG. 4, a field effect transistor 42 is utilized as the switching element in the forward path of the feedback loop. For exemplary purposes, an N-channel MOSFET having its source and drain 44, 45 connected between the output terminal 34 of the operational amplifier and the junction of the feedback loop with the output signal line 14*a*. The gate 46 of the MOSFET 42 is connected to the select signal line 18*a*. In addition, the substrate of the MOSFET is connected via a terminal 47 to a negative potential, which may (in the example given hereinbefore) comprise minus fiftten volts. This insures proper bias across the junctions between the source and drain and the substrate, as is well known in the art. The operation of the embodiment of FIG. 4 is similar to that described hereinbefore in respect to FIG. 2.

Figure 5:
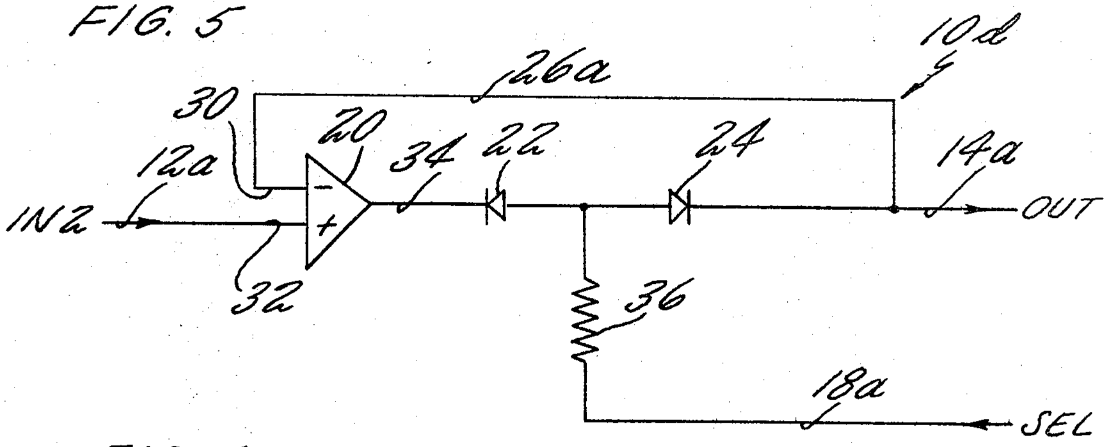
FIG. 5 is a schematic diagram of a fourth embodiment of a multiplexing switch in accordance with the present invention.

In FIG. 5, a slightly different embodiment of the present invention is illustrated. Therein, the operational amplifier 20 is connected in a non-inverting configuration by utilizing the non-inverting input 32 for the signal input. With no resistance in the feedback path 26*a*, this configuration comprises a voltage follower circuit, as is known in the art. The operation of the signal on the select line 18*a* together with the diodes 22, 24 is as described hereinbefore with with respect to FIG. 2. When the diodes are forwardly biased, the output impedance of the signal line 14*a* is lowest because the loop gain of the amplifier is highest. On the other hand, with a negative signal on the select signal line 18*a*, the diodes 22, 24 are reverse biased and the loop is opened, so that the output impedance of line 14*a* to ground is equal to the input impedance of a differential amplifier (amplifier 20) which is typically hundreds of thousands, or even millions of ohms. Thus, isolation of the non-selected circuits in comparison with the selected circuits is provided in a fashion similar to that described with respect to FIG. 2 hereinbefore.

Additionally, the transistor 40, the MOSFELT 42, or other switch arrangements may be employed in a voltage follower embodiment of the present invention similar to FIG. 5. These embodiments will not be described herein since the application of the teachings hereinbefore to various other embodiments is within the skill of the art.

A typical select circuit 16 is illustrated in FIG. 5. Therein each of the select lines 18 may be connected to a tap of a suitable switch 50 which in turn is connected to a positive source of voltage (which in the foregoing example may comprise fifteen volts positive). Each of the taps of the switch 50 is also connected through a related resistor 52 to a minus potential source (which in the foregoing example may comprise minus fifteen volts). Whichever tap is connected to the positive voltage by the armature of the switch 50 will be at the positive potential, and the remaining taps will be at the negative potential, thus supporting the operation described with respect to FIG. 2 hereinbefore.

In addition to the configurations shown in FIGS. 2–5, and extensions thereof, the present invention could employ diode quad switch circuits, junction field effect transistors, and other well-known switching configurations and elements. Similarly, although the invention has been shown and described with respect to preferred embodiments thereof, it should be obvious to those skilled in the art that the foregoing and various other changes and omissions in the form and detail thereof may be made therein, without departing from the spirit and the scope of the invention.

Having thus described typical embodiments of our invention, that which we claim as new and desire to secure by Letters Patent of the United States is:

1. An electronic multiplexing switch apparatus adapted to selectively connect a plurality of input signal lines to a single output signal channel, comprising, in combination with said input signal lines and said output signal channel:

a plurality of differential operational amplifiers, each corresponding to a related one of said input signal lines, each of said differential operational amplifiers having a pair of complementary inputs, a first one of said inputs providing an output in phase therewith, the second one of said inputs providing an out of phase output, said first one of said inputs being grounded, said second one of said inputs being connected in signal conducting relationship with the related one of said input lines;

a plurality of output signal means, one respectively relating to each of said differential operational amplifiers, each of said output signal means including electronic switch means connected between the output of the related one of said differential operational amplifiers and said output signal channel, each of said electronic switch means operable in response to an electric signal to provide a substantially high impedance or a substantially low impedance to electric signals supplied thereto by the related one of said differential operational amplifiers in response to an input signal applied to the related one of said input signal lines;

a plurality of select signal lines, one corresponding to each of said input signal lines, each connected to a related one of said electronic switch means to control the conductance of the related electronic switch means in response to a signal thereon;

and a plurality of degenerative feedback paths, one for each of said operational amplifiers, each including a resistor, each interconnecting said output signal channel with said second input of the related one of said differential operational amplifiers, whereby each of said operational amplifiers has a feedback loop including a forward path comprising said switch means over which output signals are fed and a feedback path interconnecting said output signal channel line with the second input thereof.

2. An electronic multiplexing switch apparatus adapted to selectively connect a plurality of input signal lines to a single output signal channel, comprising, in combination with said input signal lines and said output signal channel, a plurality of differential operational amplifiers, each corresponding to a related one of said input signal lines, each of said differential operational amplifiers having a pair of complementary inputs, a first one of said inputs providing an output in phase therewith, the second one of said inputs providing an out of phase output, said first one of said inputs being connected in signal conducting relationship with the related one of said input lines;

a plurality of output signal means, one respectively relating to each of said differential operational amplifiers, each of said output signal means including electronic switch means connected between the output of the related one of said differential operational amplifiers and said output signal channel, each of said electronic switch means operable in response to an electric signal to provide a substantially high impedance or a substantially low impedance to electric signals supplied thereto by the related one of said differential operational amplifiers in response to an input signal applied to the related one of said input signal lines;

a plurality of select signal lines, one corresponding to each of said input signal lines, each connected to a related one of said electronic switch means to control the conductance of the related electronic switch means in response to a signal thereon;

and a plurality of degenerative feedback paths, one for each of said operational amplifiers, each interconnecting said output signal channel with said second input of the related one of said differential operational amplifiers, whereby each of said operational amplifiers has a feedback loop including a forward path comprising said switch means over which output signals are fed and a feedback path interconnecting said output signal channel line with the second input thereof.

References Cited

UNITED STATES PATENTS

| | | | |
|---|---|---|---|
| 2,974,285 | 3/1961 | Schenck | 328—104 |
| 3,082,330 | 3/1963 | Ward | 328—154 |
| 3,152,319 | 10/1964 | Gordon et al. | 328—104 |
| 3,130,325 | 4/1964 | Rubin et al. | 307—229 |
| 3,204,118 | 8/1965 | Rotier | 307—229 |
| 3,452,217 | 6/1969 | Greeson | 307—229 |

DONALD D. FORRER, Primary Examiner

H. A. DIXSON, Assistant Examiner

U.S. Cl. X.R.

307—229, 243, 251, 253, 259; 328—151; 340—147